(12) United States Patent
Li

(10) Patent No.: US 9,287,902 B2
(45) Date of Patent: Mar. 15, 2016

(54) METHOD AND DEVICE FOR SENDING AND RECEIVING DATA

(75) Inventor: Dongsheng Li, Beijing (CN)

(73) Assignee: Tendyron Corporation (CN)

( * ) Notice: Subject to any disclaimer, the term of this patent is extended or adjusted under 35 U.S.C. 154(b) by 0 days.

(21) Appl. No.: 14/343,264

(22) PCT Filed: Aug. 6, 2012

(86) PCT No.: PCT/CN2012/079723
§ 371 (c)(1),
(2), (4) Date: Mar. 6, 2014

(87) PCT Pub. No.: WO2013/044686
PCT Pub. Date: Apr. 4, 2013

(65) Prior Publication Data
US 2014/0219388 A1    Aug. 7, 2014

(30) Foreign Application Priority Data

Sep. 26, 2011   (CN) .......................... 2011 1 0288736

(51) Int. Cl.
| | | |
|---|---|---|
| *H03K 7/04* | (2006.01) | |
| *H04B 1/02* | (2006.01) | |
| *H04L 25/49* | (2006.01) | |
| *H04B 1/06* | (2006.01) | |

(52) U.S. Cl.
CPC .. *H04B 1/02* (2013.01); *H04B 1/06* (2013.01); *H04L 25/4902* (2013.01)

(58) Field of Classification Search
CPC ......... H04B 1/02; H04B 1/06; H04L 25/4902
USPC ....................................................... 375/239
See application file for complete search history.

(56) References Cited

U.S. PATENT DOCUMENTS

| | | | | |
|---|---|---|---|---|
| 6,577,546 B2 * | 6/2003 | Fujiwara | ................ | G11C 29/12 365/189.05 |
| 7,707,122 B2 | 4/2010 | Hull et al. | | |
| 7,729,427 B2 * | 6/2010 | Kwok | .................... | H04B 3/542 326/30 |
| 8,070,108 B2 * | 12/2011 | Severson | ............... | A63H 19/24 246/1 C |
| 2006/0214815 A1 * | 9/2006 | Komatsu | ............ | H04B 10/1143 340/956 |
| 2007/0288602 A1 | 12/2007 | Sundaresan | | |
| 2011/0246574 A1 | 10/2011 | Lento et al. | | |
| 2012/0011204 A1 | 1/2012 | Morin et al. | | |
| 2013/0013682 A1 | 1/2013 | Juan et al. | | |

FOREIGN PATENT DOCUMENTS

| | | |
|---|---|---|
| CN | 101404556 A | 4/2009 |
| CN | 102333054 A | 1/2012 |

OTHER PUBLICATIONS

International Search Report for Application No. PCT/CN2013/074034 dated Jul. 11, 2013.

(Continued)

*Primary Examiner* — Qutbuddin Ghulamali
(74) *Attorney, Agent, or Firm* — Lerner, David, Littenberg, Krumholz & Mentlik, LLP

(57) ABSTRACT

A method for sending data, a data sending device, a method for receiving data, and a data receiving device are provided. The method for sending data comprises: transmitting data bit 1 by a periodic wave with a period T1 and transmitting data bit 0 by a periodic wave with a period T2, T1 being unequal to T2; and sending continuously a corresponding periodic wave according to a bit sequence of data to be sent.

18 Claims, 4 Drawing Sheets

(56) References Cited

OTHER PUBLICATIONS

International Search Report for Application No. PCT/CN2012/079723 dated Nov. 15, 2012.
Written Opinion for Application No. PCT/CN2012/079723 dated Nov. 15, 2012.
Ye, Zhen; A directly receiving method of general infrared remote codes for microchip computers, Journal of Zhangzhou Teachers College (Natural Science), May 2002, vol. 15, No, 2, pp. 45-47 (See Written Opinion for Application No. PCT/CN2012/079723 dated Nov. 15, 2012 for concise explanation of relevance).

* cited by examiner

METHOD AND DEVICE FOR SENDING AND RECEIVING DATA

CROSS-REFERENCE TO RELATED APPLICATIONS

The present application is a national phase entry under 35 U.S.C. §371 of International Application No. PCT/CN2012/079723 filed Aug. 6, 2012, published in Chinese, which claims priority from Chinese Patent Application No. 201110288736.X, filed Sep. 26, 2011, both of which are incorporated herein by reference.

FIELD

The present disclosure relates to an electronic technique field, and more particularly relates to a method and a device for sending and receiving data.

BACKGROUND

According to a conventional signal transmission technique, waves (such as a sine wave or a square wave) with a same period are usually used to distinguish bit 1 and bit 0 specifically by different duty ratios within the same period. The duty ratio refers to a proportion of a high level in a period.

According to the conventional signal transmission technique, a signal sending end transmits waves (such as the sine wave or the square wave) with the same period, a signal receiving end receives the waves (such as the sine wave or the square wave) with the same period sent by the signal sending end and detects the duty ratio thereof to distinguish bit 1 and bit 0 and thereby determines data transmitted by the signal sending end. However, a process of detecting the duty ration is comparatively complicated, which increases a workload and cost for the signal receiving end.

SUMMARY

Embodiments of the present disclosure aim to provide a method and a device for sending and receiving data to reduce a processing complexity of a receiving device.

The aim of the embodiments of the present disclosure is realized by following technical solutions:

According to an aspect of the embodiments of the present disclosure, a method for sending data is provided, comprising: transmitting data bit 1 by a periodic wave with a period T1 and transmitting data bit 0 by a periodic wave with a period T2, T1 being unequal to T2; and sending continuously a corresponding periodic wave according to a bit sequence of the data to be sent.

According to another aspect of the embodiments of the present disclosure, a data sending device is provided, comprising: a bit sequence generating unit configured to generate and output a bit sequence of data to be sent; and a wave generating and sending unit configured to transmit data bit 1 by a periodic wave with a period T1, and to transmit data bit 0 by a periodic wave with a period T2, wherein the wave generating and sending unit sends continuously a corresponding periodic wave according to the bit sequence of the data to be sent.

According to yet another aspect of the embodiments of the present disclosure, a method for receiving data is provided, comprising: receiving continuously a periodic wave; and determining a bit sequence of received data according to a period of the periodic wave, wherein data bit 1 is transmitted by the periodic wave with a period T1, data bit 0 is transmitted by the periodic wave with a period T2, and T1 is unequal to T2.

According to another aspect of the embodiments of the present disclosure, a data receiving device is provided, comprising: a receiving unit configured to receive and output a continuously periodic wave; and a determining unit configured to determine a bit sequence of received data according to a period of the periodic wave output by the receiving unit, wherein data bit 1 is transmitted by the periodic wave with a period T1, data bit 0 is transmitted by the periodic wave with a period T2, and T1 is unequal to T2.

It may be seen from a technical solution provided above by the embodiments of the present disclosure, a receiving end may determine the bit sequence of the received data according to the period of the periodic wave, which avoids a complicated process for testing a duty ratio in a prior art and reduces a load and cost of the receiving end.

BRIEF DESCRIPTION OF THE DRAWINGS

In order to explicitly illustrate a technical solution of embodiments of the present disclosure, a brief introduction for the accompanying drawings corresponding to the embodiments will be listed as follows. Apparently, the drawings described below are only corresponding to some embodiments of the present disclosure, and those skilled in the art may obtain other drawings according to these drawings without creative labour.

DETAILED DESCRIPTION

In order to explicitly illustrate a technical solution of embodiments of the present disclosure, a brief introduction for the accompanying drawings corresponding to the embodiments will be listed as follows. Apparently, the drawings described below are only corresponding to some embodiments of the present disclosure, and those skilled in the art may obtain other drawings according to these drawings without creative labour.

Figure 1:
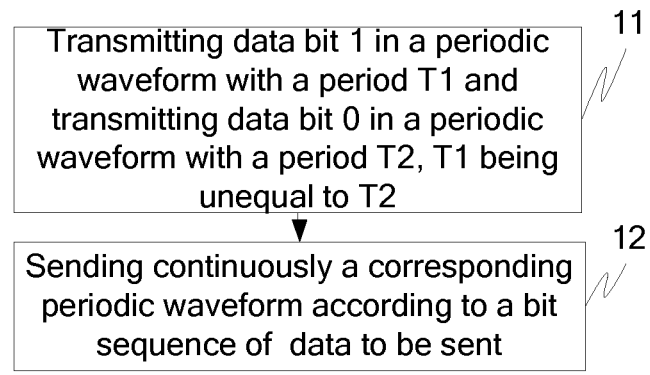
FIG. 1 is a schematic flow chart of a method for sending data according to one embodiment of the present disclosure.

As shown in FIG. 1, a method for sending data is provided according to an embodiment of the present disclosure. The method comprises following steps.

In step 11, data bit 1 is transmitted by a periodic wave with a period T1 and data bit 0 is transmitted by a periodic wave with a period T2, where T1 is unequal to T2.

In step 12, a corresponding periodic wave is sent continuously according to a bit sequence of data to be sent.

In this embodiment, an executing body may be a sending end for sending data.

It may be seen from the technical solution provided above by the embodiment of the present disclosure, a receiving end may determine the bit sequence of the received data according to the period of the periodic wave, which avoids a complicated process for testing a duty ratio in a prior art and reduces a load and cost of the receiving end.

Specifically, in the above step 11, preferably, T1:T2=1.5:1.

Alternatively, in the above step 11, the periodic wave may be: a sine wave, a square wave or a triangular wave, etc.

Specifically, in the step 12, the bit sequence of the data to be sent may comprise successively: a synchronous head, a character to be transmitted and a synchronous tail.

The synchronous head has M bits and M may be greater than or equal to 2, and bit values of the M bits of the synchronous head are the same. Preferably, M=20 and the synchronous head consists of M bits of 1. Usually, a communication link needs a stable time to guarantee a stability of the wave. Sending the synchronous head may guarantee the stability of the wave corresponding to the data to be sent, that is, sending the synchronous head guarantees that an interference pulse that may be generated when a signal starts to be sent is not corresponding to a data character.

The synchronous tail has N bits and N may be greater than or equal to 2, and bit values of the N bits of the synchronous tail are the same. Preferably, N=20 and the synchronous tail consists of N bits of 0. Sending the synchronous tail may guarantee the stability of the wave corresponding to the data character sent last, that is, sending the synchronous tail guarantees a reliable transmission for the data character sent last, such that the data character sent last may be received correctly by the receiving end.

Specifically, the character to be transmitted may comprise successively at least 1 bit of a start bit, at least 1 bit of a data bit and at least 1 bit of a stop bit.

Bit values of the start bit are the same but are unequal to the bit values of the synchronous head. If the bit values of the start bit are 0, the synchronous head consists of M bits of 1; and if the bit values of the start bit are 1, the synchronous head consists of M bits of 0, that is, the bit values of the M bits of the synchronous head are different from that of the start bit, such that the receiving end identifies correctly the start bit of the character.

Bit values of the stop bit are the same but are unequal to the bit values of the synchronous tail. If the bit values of the stop bit are 1, the synchronous tail consists of N bits of 0; and if the bit values of the stop bit are 0 the synchronous tail consists of N bits of 1 that is, the bit values of the N bits of the synchronous tail are different from that of the stop bit, such that the receiving end identifies correctly the stop bit of the character.

Figure 2:
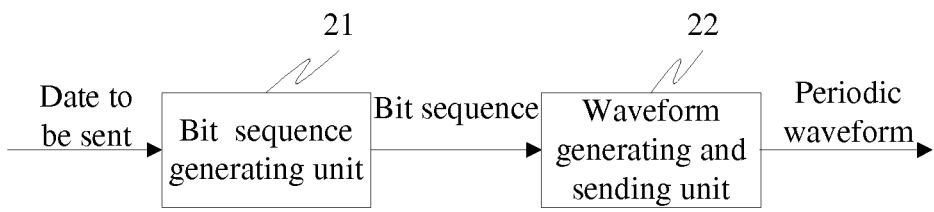
FIG. 2 is a schematic configuration diagram of a data sending device according to one embodiment of the present disclosure.

As shown in FIG. 2, corresponding to the method for sending data according to the above embodiment, a data sending device is provided according to an embodiment of the present disclosure, which comprises a bit sequence generating unit 21 and a wave generating and sending unit 22.

The bit sequence generating unit 21 is configured to generate and output a bit sequence of data to be sent.

The wave generating and sending unit 22 is configured to transmit data bit 1 by a periodic wave with a period T1, and to transmit data bit 0 by a periodic wave with a period T2. The wave generating and sending unit sends continuously a corresponding periodic wave according to the bit sequence of the data to be sent.

It may be seen from the technical solution provided above by the embodiment of the present disclosure, a receiving end may determine the bit sequence of the received data according to the period of the periodic wave, which avoids a complicated process for testing a duty ratio in the prior art and reduces a load and cost of the receiving end.

Specifically, preferably, T1:T2=1.5:1.

Alternatively, the periodic wave may be: a sine wave, a square wave or a triangular wave, etc.

Specifically, the wave generating and sending unit 22 may be configured to generate the following bit sequence of data to be sent: a synchronous head, a character to be transmitted and a synchronous tail. The synchronous head has M bits and M is greater than or equal to 2, and bit values of the M bits of the synchronous head are the same. The character to be transmitted comprises a character in the data to be sent.

Or, the wave generating and sending unit 22 may be specifically configured to generate the following bit sequence of data to be sent: a synchronous head, a character to be transmitted and a synchronous tail. The synchronous tail has N bits and N is greater than or equal to 2, and bit values of the N bits of the synchronous tail are the same. The character to be transmitted comprises a character in the data to be sent.

Specifically, the character to be sent comprises successively at least 1 bit of a start bit, at least 1 bit of a data bit and at least 1 bit of a stop bit; and bit values of the stop bit are the same and are unequal to the bit values of the synchronous tail.

Preferably, M=20 and the synchronous head consists of M bits of 1.

Preferably, N=20 and the synchronous tail consists of N bits of 0.

The data sending device and a configuration thereof according to the embodiment of the present disclosure may be understood by referring to actions executed by the sending end in the method for sending data in the above embodiment, which will not be described in detail herein.

Figure 3:
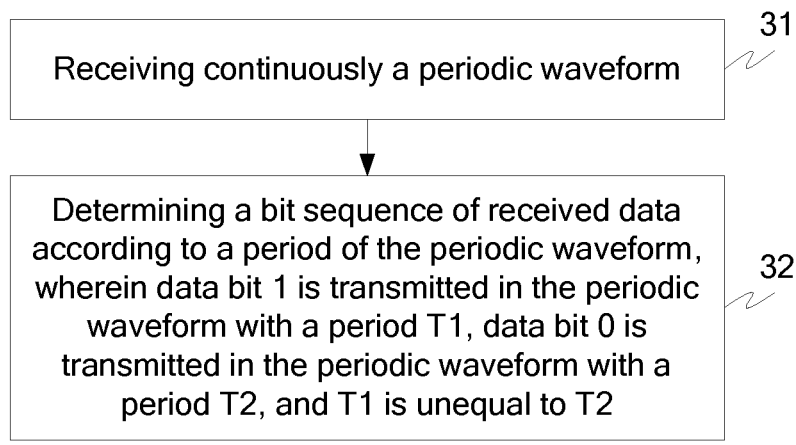
FIG. 3 is a schematic flow chart of a method for receiving data according to one embodiment of the present disclosure.

As shown in FIG. 3, a method for receiving data is provided according to an embodiment of the present disclosure. The method comprises following steps.

In step 31, a periodic wave is received continuously.

In step 32, a bit sequence of received data is determined according to a period of the periodic wave, in which data bit 1 is transmitted by the periodic wave with a period T1, data bit 0 is transmitted by the periodic wave with a period T2, and T1 is unequal to T2.

In this embodiment, an executing body may be a receiving end for receiving data.

It may be seen from the technical solution provided above by the embodiment of the present disclosure, a receiving end may determine the bit sequence of the received data according to the period of the periodic wave, which avoids a complicated process for testing a duty ratio in the prior art and reduces a load and cost of the receiving end.

Preferably, T1:T2=1.5:1.

Specifically, the periodic wave may be: a sine wave, a square wave or a triangular wave, etc.

Alternatively, when the periodic wave is the sine wave or the triangular wave, determining a bit sequence of received data according to a period of the periodic wave in step 32 may specifically comprise: converting the sine wave or the triangular wave into a corresponding square wave, and determining the bit sequence of the received data according to a time interval between rising edges of neighboring square waves; or converting the sine wave or the triangular wave into a corresponding square wave, and determining the bit sequence of the received data according to a time interval between falling edges of neighboring square waves.

Exemplarily, a comparator (or a comparison circuit) may be used at the receiving end to convert the sine wave or the triangular wave into the corresponding square wave, which facilitates to determine the bit sequence of the received data by the time interval between rising edges or falling edges of the square waves in a more intuitive manner.

Alternatively, a frequency detecting circuit may be configured at the receiving end to detect a frequency of the sine wave or the triangular wave so as to determine the bit sequence of the received data.

In the above step 32 the bit sequence of the received data comprises successively: a synchronous head, a character to be transmitted and a synchronous tail. The synchronous head has M bits and M is greater than or equal to 2, and bit values of the M bits of the synchronous head are the same. Preferably, M=20 and the synchronous head consists of M bits of 1.

Or, in the above step 32, the bit sequence of the received data comprises successively: a synchronous head, a character to be transmitted and a synchronous tail. The synchronous tail has N bits and N is greater than or equal to 2, and bit values of the N bits of the synchronous tail are the same. Preferably, N=20 and the synchronous tail consists of N bits of 0.

In the above step 32, further, according to the period of the periodic wave, it is determined that the character comprises successively: at least 1 bit of a start bit, at least 1 bit of a data bit and at least 1 bit of a stop bit; and bit values of the start bit are the same and are unequal to the bit values of the synchronous head.

Or, in the above step 32, according to the period of the periodic wave, it is determined that the character comprises successively: at least 1 bit of a start bit, at least 1 bit of a data bit and at least 1 bit of a stop bit; and bit values of the stop bit are the same and are unequal to the bit values of the synchronous tail.

Figure 4:
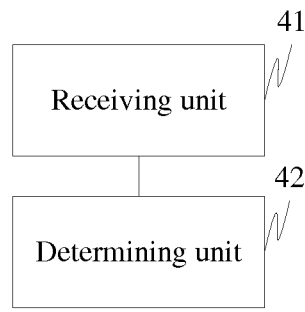
FIG. 4 is a schematic configuration diagram of a data receiving device according to one embodiment of the present disclosure.

As shown in FIG. 4, corresponding to the above method for receiving data in the above embodiment, a data receiving device is provided according to an embodiment of the present disclosure, which comprises a receiving unit 41 and a determining unit 42.

The receiving unit 41 is configured to receive and output a continuously periodic wave.

The determining unit 42 is configured to determine a bit sequence of received data according to a period of the periodic wave output by the receiving unit, in which data bit 1 is transmitted by the periodic wave with a period T1, data bit 0 is transmitted by the periodic wave with a period T2, and the T1 is unequal to T2.

It may be seen from the technical solution provided above by the embodiment of the present disclosure, a receiving end may determine the bit sequence of the received data according to the period of the periodic wave, which avoids a complicated process for testing a duty ratio in the prior art and reduces a load and cost of the receiving end.

Preferably, T1:T2=1.5:1.

Specifically, the periodic wave may be: a sine wave, a square wave or a triangular wave, etc.

When the periodic waves are the sine wave or the triangular wave, the determining unit 42 may be specifically configured to convert the sine wave or the triangular wave into the corresponding square wave and to determine the bit sequence of the received data according to a time interval between rising edges of neighboring square waves; or to convert the sine wave or the triangular wave into the corresponding square wave and to determine the bit sequence of the received data according to a time interval between falling edges of neighboring square waves.

The determining unit 42 may be further configured to determine that, the bit sequence of the received data comprises successively: a synchronous head, a character to be transmitted and a synchronous tail; The synchronous head has M bits and M is greater than or equal to 2; and bit values of the M bits of the synchronous head are the same. Preferably, M=20 and the synchronous head consists of M bits of 1.

Or, the determining unit 42 may be further configured to determine that, the bit sequence of the received data comprises successively: a synchronous head, a character to be transmitted and a synchronous tail; The synchronous tail has N bits and N is greater than or equal to 2; and bit values of the N bits of the synchronous tail are the same. Preferably, N=20 and the synchronous tail consists of N bits of 0.

Further, the determining unit 42 may be further configured to determine that, the character to be transmitted comprises successively: at least 1 bit of a start bit, at least 1 bit of a data bit and at least 1 bit of a stop bit; and bit values of the start bit are the same and are unequal to the bit values of the synchronous head.

Or, the determining unit 42 may be used to determine that, the character to be transmitted successively comprises: at least 1 bit of a start bit, at least 1 bit of a data bit and at least 1 bit of a stop bit; and bit values of the stop bit are the same and are unequal to the bit values of the synchronous tail.

Figure 5:
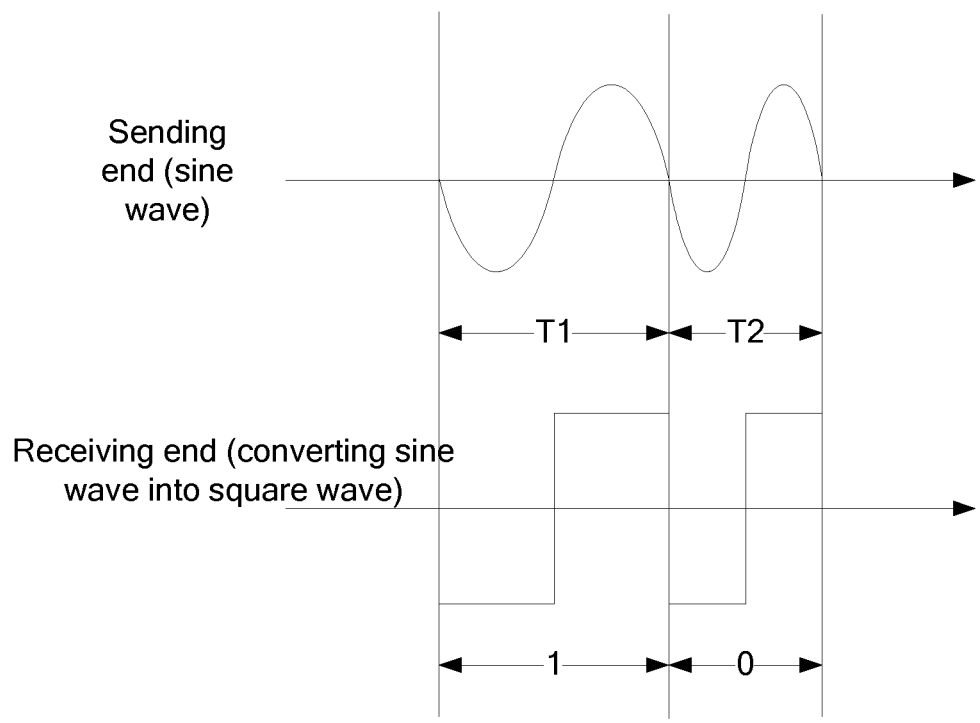
FIG. 5 is a schematic diagram of a periodic wave in a method for sending data according to another embodiment of the present disclosure.

As shown in FIG. 5, a sine wave $\sin(\omega_1 \cdot x + \pi)$ with the period T1 is used by a sending end to transmit data bit 1, and $\omega_1 = 2\pi/|T1|$; and a sine wave $\sin(\omega_0 \cdot x + \pi)$ with the period T2 is used by the sending end to transmit data bit 0, and $\omega_0 = 2\pi/|T2|$, where T1≠T2, and T1:T2=1.5:1.

Alternatively, a comparator may be used by a receiving end to convert the sine wave into a corresponding square wave, such that the receiving end may distinguish bit 0 and bit 1 only by testing the time interval between falling edges of the neighboring square waves.

Figure 6:
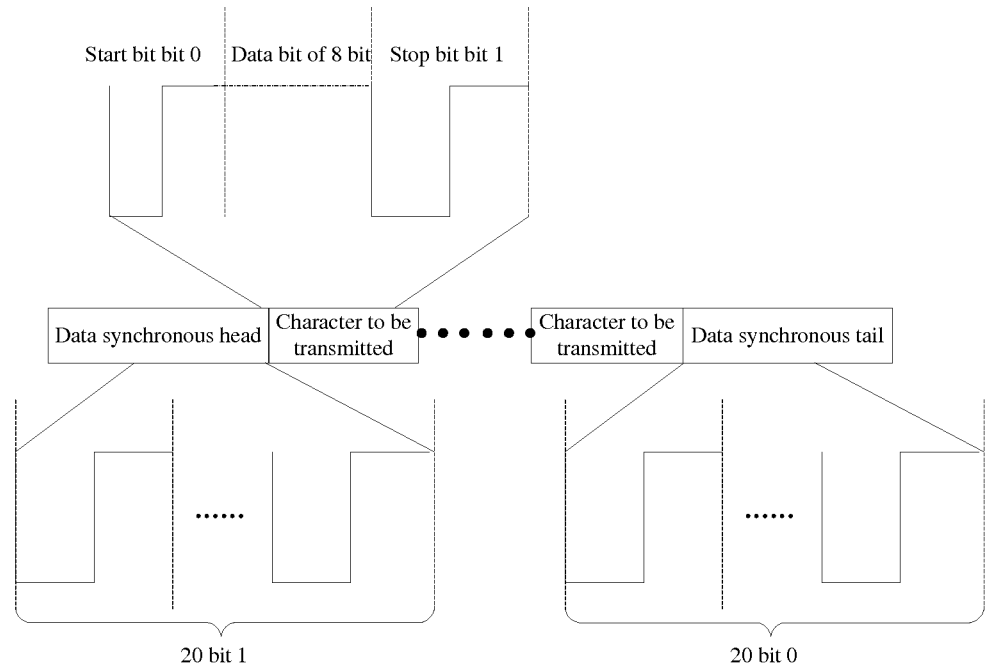
FIG. 6 is a schematic diagram of a structure of data to be sent in a method for sending data according to another embodiment of the present disclosure.

As shown in FIG. 6, the bit sequence of data to be sent comprises successively: the synchronous head, the character to be transmitted and the synchronous tail. The bit sequence of the data to be sent may comprise a plurality of characters to be transmitted. A serial communication format may be used by the characters to be transmitted.

The synchronous head has M bits and M=20 and the synchronous head consists of 20 bits of 1. Usually, a communication link needs a stable time to guarantee a stability of the wave. Sending the synchronous head may guarantee the stability of the wave corresponding to the data to be sent, that is, sending the synchronous head guarantees that an interference pulse that may be generated when a signal starts to be sent is not corresponding to a data character.

The synchronous tail has N bits and N=20 and the synchronous tail consists of N bits of 0. Sending the synchronous tail may guarantee the stability of the wave corresponding to the last sent data character, that is, sending the synchronous tail guarantees a reliable transmitting for the last sent data character, such that the last sent data character may be received correctly by the receiving end.

The above character to be transmitted may successively comprise: 1 bit of a start bit, 8 bit of a data bit and 1 bit of a stop bit.

As the synchronous head consists of M bits of 1, the start bit is bit 0 and the bit values of the M bits of the synchronous head are different from that of the start bit, thus, the receiving end may identify correctly the start bit of the character.

As the synchronous tail consists of N bits of 0, the stop bit is bit 1 and the bit values of the N bits of the synchronous tail are different from that of the stop bit, thus, the receiving end may identify correctly the stop bit of the character.

Figure 7:
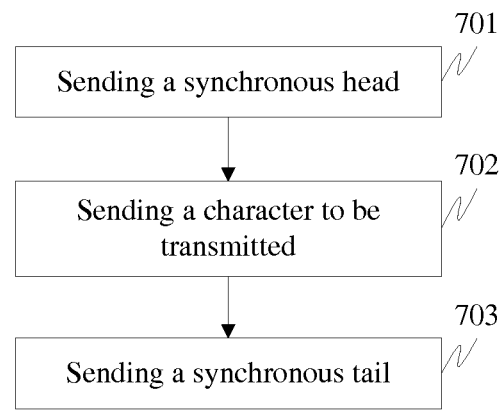
FIG. 7 is a schematic sending flowing chart of a method for sending data according to another embodiment of the present disclosure.

As shown in FIG. 7, a process of sending data to be sent by the sending end comprises:

step 701: sending the synchronous head by the sending end;

step 702: sending the character to be transmitted by the sending end; and step 703: sending the synchronous tail by the sending end.

Figure 8:
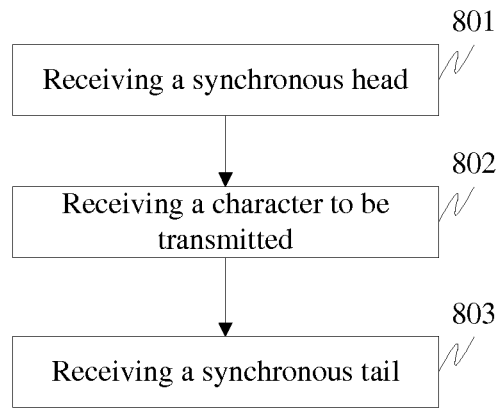
FIG. 8 is a schematic receiving flowing chart of a method for receiving data according to another embodiment of the present disclosure.

As shown in FIG. 8, a process of receiving data to be received by a receiving end comprises:

step 801: receiving the synchronous head by the receiving end;

step 802: receiving the character to be transmitted by the receiving end; and step 803: receiving the synchronous tail by the receiving end.

It may be seen from the technical solution provided above by the embodiment of the present disclosure, the receiving end may determine the bit sequence of the received data according to the period of the periodic wave, which avoids a complicated process for testing a duty ratio in the prior art and reduces a load and cost of the receiving end.

Figure 9:
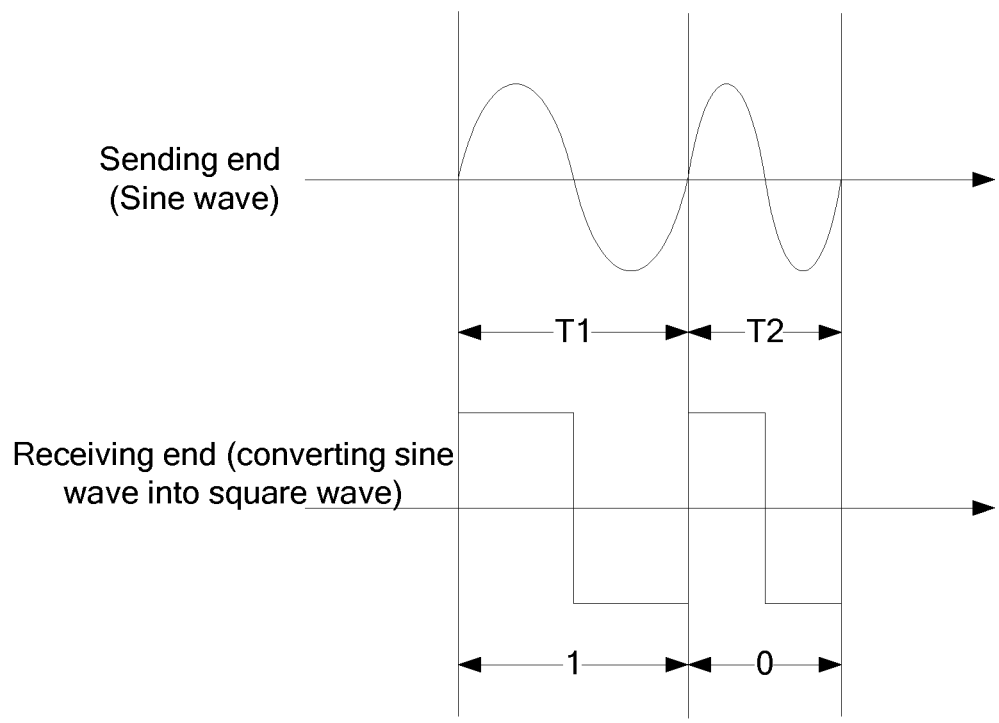
FIG. 9 is a schematic diagram of a periodic wave in a method for sending data according to another embodiment of the present disclosure.

Alternatively, as shown in FIG. 9, differences between the methods for sending and receiving data of this embodiment and the methods for sending and receiving data illustrated in FIGS. 5-8 lie in that: a sine wave $\sin(\omega_1 \cdot x)$ with the period T1 is used to represent 1, and $\omega_1=2\pi/|T1|$; and a sine wave $\sin(\omega_0 \cdot x)$ with the period T2 is used to represent 0, and $\omega_0=2\pi/|T2|$. $T1 \neq T2$, and $T1:T2=1.5:1$.

The methods for sending and receiving data of this embodiment of the present disclosure may be understood correspondingly to the methods for sending and receiving data illustrated in FIGS. 5-8, which are not described in detail herein.

Alternatively, a difference between the methods for sending and receiving data of this embodiment of the present disclosure and the methods for sending and receiving data illustrated in FIGS. 5-8 lies in that the periodic wave is the triangular wave.

The methods for sending and receiving data of this embodiment of the present disclosure may be understood similarly with the methods for sending and receiving data illustrated in FIGS. 5-8, which are not described in detail herein.

Alternatively, a difference between the methods for sending and receiving data of this embodiment of the present disclosure and the methods for sending and receiving data illustrated in FIGS. 5-8 lies in that the periodic wave is the square wave.

The methods for sending and receiving data of this embodiment of the present disclosure may be understood correspondingly to the methods for sending and receiving data illustrated in FIGS. 5-8, which are not described in detail herein.

Although explanatory embodiments have been shown and described above, they are not construed to limit the present invention. Any changes, alternatives, and modifications made within the technical scope of the present disclosure by those skilled in the art should be included within the protection scope of the present disclosure which is defined by the protection scope of the claims.

Those skilled in the art shall understand that all or parts of the processes in the above exemplifying method of the present disclosure may be achieved by commanding the related hardware with programs. The programs may be stored in a computer readable storage medium, and the programs comprise one or a combination of the processes in the method embodiments of the present disclosure when run on a computer. The storage medium mentioned above may be magnetic disks, CD, read-only memories (ROM), or random access memory (RAM), etc.

The invention claimed is:

1. A method for sending data, comprising:
   transmitting data bit 1 by a first periodic wave with a period T1 and transmitting data bit 0 by a second periodic wave with a period T2, T1 being unequal to T2, wherein the second periodic wave is other than the first periodic wave; and
   sending continuously a corresponding periodic wave according to a bit sequence of data to be sent,
   wherein the bit sequence of the data to be sent comprises successively a synchronous head, a character to be transmitted and a synchronous tail;
   the synchronous head has M bits and M is greater than or equal to 2, and bit values of the M bits of the synchronous head are the same;
   the synchronous tail has N bits and N is greater than or equal to 2, and bit values of the N bits of the synchronous tail are the same.

2. The method according to claim 1, wherein
   the character to be transmitted comprises successively at least 1 bit of a start bit, at least 1 bit of a data bit and at least 1 bit of a stop bit; and
   bit values of the start bit are the same and are unequal to the bit values of the synchronous head.

3. The method according to claim 1, wherein
   the character to be transmitted comprises successively at least 1 bit of a start bit, at least 1 bit of a data bit and at least 1 bit of a stop bit; and
   bit values of the stop bit are the same and are unequal to the bit values of the synchronous tail.

4. The method according to claim 1, wherein M=20 and the synchronous head consists of M bits of 1.

5. The method according to claim 1, wherein N=20 and the synchronous tail consists of N bits of 0.

6. The method according to claim 1, wherein the first and second periodic waves are both a sine wave, a square wave or a triangular wave.

7. A data sending device, comprising:
   a bit sequence generating unit configured to generate and output a bit sequence of data to be sent; and
   a wave generating and sending unit configured to transmit data bit 1 by a first periodic wave with a period T1, to transmit data bit 0 by a second periodic wave with a period T2 which is unequal to period T1, wherein the second periodic wave is other than the first periodic wave, and the wave generating and sending unit sends continuously a corresponding periodic wave according to the bit sequence of the data to be sent,
   wherein the bit sequence generating unit is configured to generate the following bit sequence of data to be sent: a synchronous head, a character to be transmitted and a synchronous tail;
   the synchronous head has M bits and M is greater than or equal to 2, bit values of the M bits of the synchronous head are the same;
   the character to be transmitted contains a character in the data to be sent;
   the synchronous tail has N bits and N is greater than or equal to 2, bit values of the N bits of the synchronous tail are the same.

8. The data sending device according to claim 7, wherein
the character to be transmitted comprises successively at least 1 bit of a start bit, at least 1 bit of a data bit and at least 1 bit of a stop bit; and
bit values of the start bit are the same and are unequal to the bit values of the synchronous head.

9. The data sending device according to claim 7, wherein
the character to be transmitted comprises successively at least 1 bit of a start bit, at least 1 bit of a data bit and at least 1 bit of a stop bit; and
bit values of the stop bit are the same and are unequal to the bit values of the synchronous tail.

10. The data sending device according to claim 7, wherein M=20 and the synchronous head consists of M bits of 1.

11. The data sending device according to claim 7, wherein N=20 and the synchronous tail consists of N bits of 0.

12. The data sending device according to claim 7, wherein the first and second periodic waves are both a sine wave, a square wave or a triangular wave.

13. A method for receiving data, comprising:
receiving continuously a periodic wave; and
determining a bit sequence of received data according to a period of the periodic wave, wherein data bit 1 is transmitted by the periodic wave with a period T1, data bit 0 is transmitted by the periodic wave with a period T2, and T1 is unequal to T2,
wherein the periodic wave with period T1 is other than the periodic wave with period T2, and the bit sequence of the received data comprises successively a synchronous head, a character to be transmitted and a synchronous tail;
the synchronous head has M bits and M is greater than or equal to 2, bit values of the M bits of the synchronous head are the same;
the synchronous tail has N bits and N is greater than or equal to 2, bit values of the N bits of the synchronous tail are the same.

14. The method according to claim 13, wherein
the periodic wave with period T1 and the periodic wave with period T2 are both a sine wave, a square wave or a triangular wave; and
if the periodic wave is the sine wave or the triangular wave, determining a bit sequence of received data according to a period of the periodic wave comprises:
converting the sine wave or the triangular wave into a corresponding square wave, and determining the bit sequence of the received data according to a time interval between rising edges of neighboring square waves; or
converting the sine wave or the triangular wave into a corresponding square wave, and determining the bit sequence of the received data according to a time interval between falling edges of neighboring square waves.

15. The method according to claim 13, wherein
the character to be transmitted comprises successively: at least 1 bit of a start bit, at least 1 bit of a data bit and at least 1 bit of a stop bit; and
bit values of the start bit are the same and are unequal to the bit values of the synchronous head.

16. The method according to claim 13, wherein
the character to be transmitted comprises successively at least 1 bit of a start bit, at least 1 bit of a data bit and at least 1 bit of a stop bit; and
bit values of the stop bit are the same and are unequal to the bit values of the synchronous tail.

17. The method according to claim 13, wherein M=20 and the synchronous head consists of M bits of 1.

18. The method according to claim 13, wherein N=20 and the synchronous tail consists of N bits of 0.

* * * * *